(12) United States Patent
Teng et al.

(10) Patent No.: US 12,225,075 B2
(45) Date of Patent: Feb. 11, 2025

(54) METHODS, APPARATUSES, AND DEVICES FOR LEASE TRANSFER BETWEEN MASTER AND SLAVE REPLICAS

(71) Applicant: Beijing OceanBase Technology Co., Ltd., Beijing (CN)

(72) Inventors: Xuwang Teng, Beijing (CN); Jinliang Xiao, Beijing (CN); Fanyu Kong, Beijing (CN); Hao Liu, Beijing (CN); Bin Jade, Beijing (CN); Fusheng Han, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 18/490,487

(22) Filed: Oct. 19, 2023

(65) Prior Publication Data
US 2024/0137407 A1  Apr. 25, 2024
US 2024/0236175 A9  Jul. 11, 2024

(30) Foreign Application Priority Data

Oct. 24, 2022  (CN) .......................... 202211299914.3

(51) Int. Cl.
*G06F 16/27*  (2019.01)
*G06F 11/14*  (2006.01)
(Continued)

(52) U.S. Cl.
CPC ................ *H04L 67/1001* (2022.05)

(58) Field of Classification Search
CPC ...... G06F 16/27; G06F 16/273; G06F 16/219; G06F 17/30309; G06F 11/1464; G06F 11/1461; H04L 41/0668; H04L 41/0663; H04L 67/10; H04L 67/1095; H04L 67/1001; H04W 84/20
See application file for complete search history.

(56) References Cited

U.S. PATENT DOCUMENTS 9,984,140 B1 * 5/2018 Sukumaran ............. G06F 16/27
10,565,227 B1 * 2/2020 Chen ....................... G06F 16/27
(Continued)

FOREIGN PATENT DOCUMENTS

CN  112905556  6/2021

*Primary Examiner* — Chris Parry
*Assistant Examiner* — Hassan A Khan
(74) *Attorney, Agent, or Firm* — Fish & Richardson P.C.

(57) ABSTRACT

Lease transfer between master and slave replicas is described. A master replicator determines that an initial master replica lease takes effect. On determining that a master replica transfer needs to be performed, sending a transfer preparation message to a target replicator prior to expiration of a current master replica lease. The target replicator locally starts and calculates a new master replica lease and returns a readiness response to the master replicator. The master replicator sends a lease extension message to remaining slave replicators to extend local corresponding leases. After receiving lease extension success responses of a majority of the slave replicators, the master replicator terminates the local master replica lease of the master replicator in advance, and sends a transfer confirmation message to the target replicator. The target replicator validates the new master replica lease to make the target replicator a new master replicator.

20 Claims, 7 Drawing Sheets

(51) Int. Cl.
*G06F 16/21* (2019.01)
*H04L 67/1001* (2022.01)
*H04L 67/1095* (2022.01)
*H04W 84/20* (2009.01)

(56) References Cited

U.S. PATENT DOCUMENTS

| | | | |
|---|---|---|---|
| 2008/0010490 A1* | 1/2008 | Revanuru | G06F 11/2097 |
| | | | 714/4.1 |
| 2011/0225120 A1* | 9/2011 | Cooper | G06F 16/273 |
| | | | 707/610 |
| 2015/0046395 A1* | 2/2015 | Rath | G06F 16/27 |
| | | | 707/623 |
| 2024/0137407 A1* | 4/2024 | Teng | H04L 67/1001 |

* cited by examiner

METHODS, APPARATUSES, AND DEVICES FOR LEASE TRANSFER BETWEEN MASTER AND SLAVE REPLICAS

CROSS-REFERENCE TO RELATED APPLICATIONS

This application claims priority to Chinese Patent Application No. 202211299914.3, filed on Oct. 24, 2022, which is hereby incorporated by reference in its entirety.

TECHNICAL FIELD

This specification relates to the field of distributed system technologies, and in particular, to methods, apparatuses, and devices for lease transfer between master and slave replicas.

BACKGROUND

In the Internet era, as the data scale expands, requirements for scalability and availability of application service capabilities are put forward. These requirements are hard to be satisfied on a single machine. Therefore, a distributed concept is derived. To be specific, one application runs on a distributed cluster that includes a plurality of machines. As such, an external service capability of the application can be improved by increasing the quantity of machines in the cluster, to cope with an increasing large data scale.

When the application moves from a single machine to a distributed system, the basic problem faced by the system is a single point of failure. Such problem severely affects service availability, and is usually alleviated based on master/slave disaster recovery. The distributed system includes a plurality of nodes. Each node includes one or more machines. Different machines or different nodes can work in master/slave mode. If a machine or a node is faulty, a backup machine or node can be automatically switched to run, thereby greatly improving service availability.

For an object (for example, a node, a machine, or data on a machine) in master/slave mode, the object has a plurality of replicas. One master replica needs to be elected from the plurality of replicas, and remaining replicas are slave replicas. Generally, a maximum of one master replica of the object is required at any moment. If the master replica is normal, a service is provided by the master replica. If the master replica is faulty and cannot provide a service, one slave replica can be re-elected as a new master replica to continue to provide a service, thereby ensuring that the object is continuously available.

Conventional election solutions only take into account how to elect a master replica. However, in practical engineering applications, the location of the master replica usually needs to be adjusted.

A round of election should not be performed again for the master replica transfer action since the engineering requires that the action be completed in a sufficiently short time and with sufficiently slight impact. Therefore, it is necessary to design a set of appropriate lightweight protocols for the master replica transfer procedure to improve efficiency and reduce impact.

SUMMARY

One or more embodiments of this specification provide methods, apparatuses, devices, and storage media for lease transfer between master and slave replicas, so as to alleviate the following technical problem: it is necessary to design a set of appropriate lightweight solutions for the master replica transfer procedure to improve efficiency and reduce impact.

To alleviate the above-mentioned technical problem, one or more embodiments of this specification provide the following solutions:

One or more embodiments of this specification provide a method for lease transfer between master and slave replicas, including: locally starting to calculate, by a master replicator, an initial master replica lease, and sending a lease establishment message to a plurality of slave replicators; locally starting to calculate, by the slave replicators after receiving the lease establishment message, corresponding leases at the slave replicators, and sending lease establishment success responses to the master replicator; determining, by the master replicator, that the local master replica lease of the master replicator takes effect in response to receiving the lease establishment success responses from a majority of the slave replicators; sending, by the master replicator, a transfer preparation message to a target replicator in the plurality of slave replicators before the local current master replica lease of the master replicator expires in response to determining that master replica transfer needs to be performed; locally starting and calculating, by the target replicator after receiving the transfer preparation message, a new master replica lease at the target replicator, and returning a readiness response to the master replicator; sending, by the master replicator after receiving the readiness response, a lease extension message to remaining slave replicators to extend local corresponding leases of the remaining slave replicators; terminating, by the master replicator after receiving lease extension success responses returned by a majority of the slave replicators, the local master replica lease of the master replicator in advance, and sending a transfer confirmation message to the target replicator; and validating, by the target replicator after receiving the transfer confirmation message, the new master replica lease to make the target replicator a new master replicator.

One or more embodiments of this specification provide an apparatus for lease transfer between master and slave replicas, including: an initial lease module belonging to the master replicator, configured to locally start to calculate an initial master replica lease, and send a lease establishment message to a plurality of slave replicators; an initial response module belonging to the slave replicators, configured to locally start to calculate corresponding leases at the slave replicators after receiving the lease establishment message, and send lease establishment success responses to the master replicator; an initial validation module belonging to the master replicator, configured to determine that the local master replica lease of the master replicator takes effect in response to receiving the lease establishment success responses from a majority of the slave replicators; a transfer preparation module belonging to the master replicator, configured to send a transfer preparation message to a target replicator in the plurality of slave replicators before the local current master replica lease of the master replicator expires in response to determining that master replica transfer needs to be performed; a readiness module belonging to the target replicator, configured to locally start and calculate a new master replica lease at the target replicator after receiving the transfer preparation message, and return a readiness response to the master replicator; a lease extension module belonging to the master replicator, configured to send a lease extension message to remaining slave replicators after receiving the readiness response, to extend local corresponding leases of the remaining slave replicators; a transfer confirmation module belonging to the master replicator, configured to terminate the local master replica lease of the master replicator in advance after receiving lease extension success responses returned by a majority of the slave replicators, and send a transfer confirmation message to the target replicator; and a new master validation module belonging to the target replicator, configured to validate the new master replica lease after receiving the transfer confirmation message, to make the target replicator a new master replicator.

One or more embodiments of this specification provide a device for lease transfer between master and slave replicas, including: at least one processor; and a memory communicatively connected to the at least one processor, where the memory stores an instruction that can be executed by the at least one processor, and the instruction is executed by the at least one processor to enable the at least one processor to perform the following operations: locally starting to calculate, by a master replicator, an initial master replica lease, and sending a lease establishment message to a plurality of slave replicators; locally starting to calculate, by the slave replicators after receiving the lease establishment message, corresponding leases at the slave replicators, and sending lease establishment success responses to the master replicator; determining, by the master replicator, that the local master replica lease of the master replicator takes effect in response to receiving the lease establishment success responses from a majority of the slave replicators; sending, by the master replicator, a transfer preparation message to a target replicator in the plurality of slave replicators before the local current master replica lease of the master replicator expires in response to determining that master replica transfer needs to be performed; locally starting and calculating, by the target replicator after receiving the transfer preparation message, a new master replica lease at the target replicator, and returning a readiness response to the master replicator; sending, by the master replicator after receiving the readiness response, a lease extension message to remaining slave replicators to extend local corresponding leases of the remaining slave replicators; terminating, by the master replicator after receiving lease extension success responses returned by a majority of the slave replicators, the local master replica lease of the master replicator in advance, and sending a transfer confirmation message to the target replicator; and validating, by the target replicator after receiving the transfer confirmation message, the new master replica lease to make the target replicator a new master replicator.

One or more embodiments of this specification provide a non-volatile computer storage medium, where the non-volatile computer storage medium stores a computer-executable instruction, and the computer-executable instruction is set to perform the following operations: locally starting to calculate, by a master replicator, an initial master replica lease, and sending a lease establishment message to a plurality of slave replicators; locally starting to calculate, by the slave replicators after receiving the lease establishment message, corresponding leases at the slave replicators, and sending lease establishment success responses to the master replicator; determining, by the master replicator, that the local master replica lease of the master replicator takes effect in response to receiving the lease establishment success responses from a majority of the slave replicators; sending, by the master replicator, a transfer preparation message to a target replicator in the plurality of slave replicators before the local current master replica lease of the master replicator expires in response to determining that master replica transfer needs to be performed; locally starting and calculating, by the target replicator after receiving the transfer preparation message, a new master replica lease at the target replicator, and returning a readiness response to the master replicator; sending, by the master replicator after receiving the readiness response, a lease extension message to remaining slave replicators to extend local corresponding leases of the remaining slave replicators; terminating, by the master replicator after receiving lease extension success responses returned by a majority of the slave replicators, the local master replica lease of the master replicator in advance, and sending a transfer confirmation message to the target replicator; and validating, by the target replicator after receiving the transfer confirmation message, the new master replica lease to make the target replicator a new master replicator.

At least one of the above-mentioned technical solutions used in one or more embodiments of this specification can achieve the following beneficial effects: When a master replica needs to be transferred, the master replicator first enables the target replicator to calculate a new master replica lease and gets the target replicator ready such that on the target replicator, although the new master replica lease does not take effect, timing for the lease has started. The master replicator further actively extends the lease once to the slave replicator such that a lease termination time of the current master replica lease of the slave replicator is postponed to be later than a lease termination time of the new master replica lease. As such, after the new master replica lease takes effect, and the target replicator becomes a new master replicator, the master replica lease of the slave replicator still expires later than the new master replica lease. In such case, during an effective period of the master replica status of the new master replicator, the slave replicator does not conduct new election, ensuring uniqueness of the master replica. In such a process, there is no need to wait for expiration of the previous master replica lease, and the master replica transfer can be started at any time as needed, providing high flexibility and high efficiency. In such a process, there may be temporarily no master replica only in the sending and receiving period of the transfer confirmation message. However, such a period is quite short and is at a millisecond level, and therefore has little impact on service availability.

BRIEF DESCRIPTION OF DRAWINGS

To describe the technical solutions in some embodiments of this specification or in a conventional technology more clearly, the following briefly describes the accompanying drawings needed for describing some embodiments or the conventional technology. Clearly, the accompanying drawings in the following descriptions merely show some embodiments of this specification, and a person of ordinary skill in the art can still derive other drawings from these accompanying drawings without creative efforts.

DESCRIPTION OF EMBODIMENTS

Figure 1:
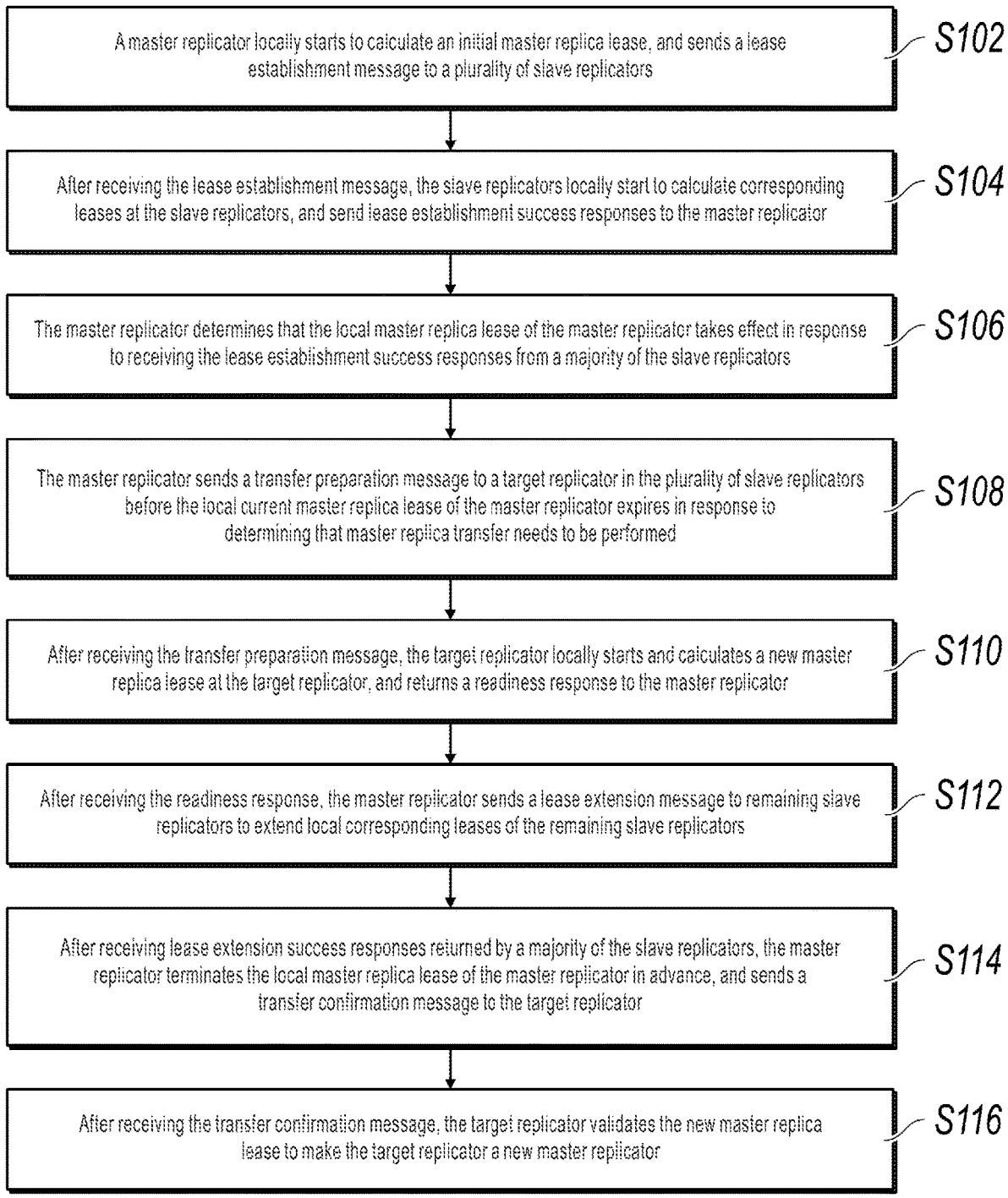
FIG. 1 is a schematic flowchart illustrating a method for lease transfer between master and slave replicas, according to one or more embodiments of this specification.

Some embodiments of this specification provide methods, apparatuses, devices, and storage media for lease transfer between master and slave replicas.

To make a person skilled in the art better understand the technical solutions in this specification, the following clearly and comprehensively describes the technical solutions in some embodiments of this specification with reference to the accompanying drawings in some embodiments of this specification. Clearly, the described embodiments are merely some but not all of embodiments of this application. All other embodiments obtained by a person of ordinary skill in the art based on some embodiments of this specification without creative efforts shall fall within the protection scope of this application.

As mentioned in the BACKGROUND section, a single point of failure problem affects service availability of a distributed system. For better understanding, an example is provided. In a distributed cluster that includes 100 machines, it is assumed that each machine is available during 99% of the time of each year, and may be unavailable because of various factors such as hardware, power supply, operation and maintenance, and software crash during 1% of the time. It is assumed that a fault probability of each machine is distributed independently, and then the time during which all machines in the entire distributed cluster are completely available is 99% raised to the power of 100, that is, 36.6%, which is completely unacceptable for enterprise services.

However, if the master/slave disaster recovery solution is used, for example, if one node includes five machines, which respectively form five replicas, and a quorum protocol is applied to ensure service availability, then as long as at least three machines in the node run normally, overall availability of the node can be ensured. Significance of a plurality of replicas for improving service availability can be intuitively understood through simple probability calculation.

Five replicas are still used as an example. As long as three of the five replicas survive, the availability of the node increases from 99% of single machine availability to:

$$C_5^3 \cdot 99\%^3 \cdot 1\%^2 + C_5^4 \cdot 99\%^4 \cdot 1\% + C_5^5 \cdot 99\%^5 = 99.99901494\%$$

The availability of a single node changes from 99% (two nines) to 99.999% (five nines), which increases by three orders of magnitude. Therefore, the availability of the entire cluster of 100 nodes increases to:

$$99.99901494\%^{100} = 99.901542017\%$$

Compared with 36.6% availability of the cluster in the case of single replica deployment, the overall availability of the cluster in the case of five replicas can still maintain a high standard of 99.9% (three nines).

As further mentioned in the BACKGROUND section, in practical engineering applications, the location of the master replica usually needs to be adjusted.

For example, master replicas of various services (the services here can be broadly understood, for example, a service processing capability as a computing resource, and for another example, a data table as a data resource or a part of data in a data table, or the like) are concentrated on a machine, and load balancing is expected to be achieved by changing locations of master replicas of some of the services. For another example, when some operation and maintenance operations need to be performed in a cluster, typically, for example, software and hardware upgrade is performed on a machine, a master replica role on the machine needs to be transferred to another slave replica in advance, and is transferred back after the upgrade is completed.

In this application, implementing master replica transfer based on a timeout message is considered. Specifically, a current master replicator sends a timeout message to a target slave replicator. After receiving the message, the target slave replicator initiates election and becomes a new master replicator. Such a method is relatively simple, but cannot ensure uniqueness of the master replica at any moment. In addition, when linear consistency reading needs to be performed, some cumbersome interaction procedures need to be further performed, including determining, with a quorum slave replicator, that the target slave replicator is a currently valid master replicator, and the like. As a result, a cost of performing linear consistency reading on the master replicator is excessively high. The uniqueness of the master replica here means that in an entire distributed system, one service has only one master replica at the same moment, but can have a plurality of slave replicas. For ease of description, unless otherwise specified, the master replica and the slave replica mentioned in this application are replicas of the same service, and a case of different services can be similarly processed based on an idea of a plurality of replicas for a single service.

To alleviate these problems, this application ensures the uniqueness of the master replica based on a lease, and the uniqueness of the master replica helps implement efficient linear consistency reading. The lease is a mechanism for detecting a survival state between distributed systems, and a relationship between master and slave replicas in this application can be maintained based on the lease. The lease has a specified lease duration (for example, 10 seconds). It is assumed that a machine A represents a master replica, and a machine B represents a slave replica. The machine A can hold a lease of the machine B to maintain a master and slave relationship between the machine A and the machine B. If the machine A wants to maintain its master replica status, the machine A needs to send a message to the machine B before the lease expires (for example, within 10 seconds) to extend an expiration time of the lease.

FIG. 1 is a schematic flowchart illustrating a method for lease transfer between master and slave replicas, according to one or more embodiments of this specification. Steps in such a procedure can be performed by a corresponding replicator. Here, the replicator refers to a replica itself, or a software/hardware resource corresponding to the replica. For example, the software/hardware resource is a thread or a process that works for the replica, or a machine or a node in which the replica is located.

In such a procedure, transfer of the master replica status is implemented through transfer of the master replica lease. If the current master replicator becomes a slave replicator or temporarily stops the service, the target replicator becomes a new master replicator.

The procedure in FIG. 1 includes the following steps:

S102: A master replicator locally starts to calculate an initial master replica lease, and sends a lease establishment message to a plurality of slave replicators.

The initial master replica lease is a master replica lease to be established for the first time after the master replicator is designated or elected as the master replica. After the initial master replica lease takes effect and before the initial master replica lease expires, the master replicator can extend the lease to maintain its master replica status. Such a lease extension action can be performed a plurality of times. The master replica lease has started to be calculated, and timing for the corresponding lease duration can be started. However, the lease itself has not yet taken effect in such case.

S104: After receiving the lease establishment message, the slave replicators locally start to calculate corresponding leases at the slave replicators, and send lease establishment success responses to the master replicator.

The corresponding lease corresponds to the current master replica lease of the master replicator, and the two leases usually have equal duration. Since message exchange between the master and slave replicas takes time, the corresponding lease lags behind the master replica lease to some extent.

S106: The master replicator determines that the local master replica lease of the master replicator takes effect in response to receiving the lease establishment success responses from a majority of the slave replicators.

S108: The master replicator sends a transfer preparation message to a target replicator in the plurality of slave replicators before the local current master replica lease of the master replicator expires in response to determining that master replica transfer needs to be performed.

In one or more embodiments of this specification, before S108 is performed, the master replicator may have extended the lease one or more times. In such case, a moment of the current master replica lease of the master replicator may be later than or even far later than a moment of the initial master replica lease.

In one or more embodiments of this specification, the master replicator in S102 is the current master replicator described above. It is currently expected to transfer the master replica status from the current master replicator to one slave replicator, which is referred to as a target replicator. For ease of description, in some of the following embodiments, the current master replicator can also be referred to as an old master replicator, and the target replicator can also be referred to as a new master replicator.

A specific slave replicator is selected as the target replicator based on actual needs (for example, load balancing and temporary maintenance replacement). Load balancing is u sed as an example. A machine with a slighter current workload or with a smaller current quantity of master replicators of different services is selected, and a slave replicator corresponding to the machine is used as the target replicator. Temporary maintenance replacement is used as an example. Since an equipment room in which the current master replicator is located may need to be maintained as a whole, another equipment room whose geographical location is as close as possible to the equipment room can be selected, and a slave replicator can be selected from the another equipment room as the target replicator.

S110: After receiving the transfer preparation message, the target replicator locally starts and calculates a new master replica lease at the target replicator, and returns a readiness response to the master replicator.

In one or more embodiments of this specification, the master replicator is currently holding the master replica lease, and each slave replicator holds a lease corresponding to the master replica lease and maintains the master replica status of the master replicator based on the master replica lease.

When receiving a transfer preparation message, the target replicator knows that the target replicator is selected to take over the master replica status. Therefore, the target replicator can start to calculate a new master replica lease. Here, the calculation includes determining a lease termination time of the new master replica lease, and can further include performing timing for the new master replica lease to start maintaining the new master replica lease. Since the new master replica lease has not been confirmed by the master replicator, in such case, the new master replica lease has not yet taken effect, although the timing has started. The new master replica lease (which is used to maintain the master replica status of the target replicator after taking effect) can be a newly established lease, or can alternatively be obtained by modifying a local lease corresponding to an old master replica lease.

S112: After receiving the readiness response, the master replicator sends a lease extension message to remaining slave replicators to extend local corresponding leases of the remaining slave replicators.

There are leases between the master replicator and each of at least a majority of the slave replicators. The master replicator needs to send a lease extension message to a corresponding slave replicator before a current lease termination time of the lease expires, so as to indicate that the lease continues to be valid such that the master replicator can still maintain its master replica status. When a length of the lease duration is fixed, the lease duration is initially set. After each lease extension, the lease duration continues to be used. In such case, the lease termination time before extension is certainly postponed. For example, the postponing method is to backwardly calculate lease duration from the current time such that a reached time point is used as the lease termination time after extension (such a method is more flexible and easy to control, and therefore is assumed to be used). For another example, lease duration is backwardly calculated from the lease termination time before extension, and a reached time point is used as the lease termination time after extension.

However, it is worthwhile to note that the purpose of extending the lease by the master replicator in S106 is not to continue to maintain the master replica status of the master replicator, but to make preparation for the new master replica. The time sequence between the lease termination times is strictly controlled to ensure the uniqueness of the master replica. In addition, it is worthwhile to note that, the master replicator currently extends the lease even to the extent that the lease extension for the slave replicator can be mainly ensured. For the master replicator itself, if necessary, it can be considered that the local lease of the master replicator does not strictly follow the current extension to the end. The reason is that the purpose of the current extension varies.

In one or more embodiments of this specification, it is assumed that the length of the lease duration is fixed. Currently, local corresponding leases of the remaining slave replicators still correspond to the above-mentioned old master replica lease, and are under timing. A time at which the timing for the new master replica lease starts is later. As such, the local corresponding lease of the slave replicator expires first, and in such case, the slave replicator re-elects the master replicator, possibly posing a risk that two master replicas (i.e., the target replicator and the re-elected master replicator) show up at the same time. To avoid such a risk, the current master replicator actively extends the lease once to the remaining slave replicators after the target replicator starts the timing for the new master replica lease, thereby forcibly extending the lease termination time of the slave replicators. In summary, it is ensured that the lease termination time of the local corresponding leases of the remaining slave replicators after the extension is later than the lease termination time of the new master replica lease, thereby ensuring the uniqueness of the master replica.

Specifically, for example, when locally starting and calculating the new master replica lease, the target replicator can forwardly calculate specified lease duration by using a local current time as a start point to obtain the lease termination time of the new master replica lease, and keep the new master replica lease in an ineffective state, and start timing for the new master replica lease from the current time. Based on the above-mentioned description, before the master replicator receives the lease extension success responses returned by the majority of the slave replicators, the majority of the slave replicas forwardly calculate, after receiving the lease extension message from the master replicator, the specified lease duration by using the local current time as the start point to obtain a lease termination time of local corresponding leases of the slave replicators after the extension. As such, a reasonable time sequence between two types of lease termination times of the target replicator and other slave replicators is strictly ensured.

In one or more embodiments of this specification, the master replicator can temporarily consider the target replicator as a slave replicator, and similarly, extend the lease with the target replicator. In such case, if the transfer fails in the end, an original state and a time line of the target replicator are not affected.

S114: After receiving lease extension success responses returned by a majority of the slave replicators, the master replicator terminates the local master replica lease of the master replicator in advance, and sends a transfer confirmation message to the target replicator.

In one or more embodiments of this specification, after receiving lease extension success responses returned by a majority of the slave replicators, the master replicator does not need to wait for the local master replica lease to expire, but can directly terminate the master replica status of the master replicator and instruct, by using a transfer confirmation message, the target replicator to officially take over the master replica status.

S116: After receiving the transfer confirmation message, the target replicator validates the new master replica lease to make the target replicator a new master replicator.

It can be seen that, before the transfer confirmation message is sent, the old master replicator still maintains the master replica status. After the transfer confirmation message is sent, the old master replica may terminate the master replica status. In such case, for a corresponding service, the service may be transitorily in a state of no master replica throughout the distributed system. As mentioned above, such a case has little impact, since the target replicator can become the master replicator after receiving the transfer confirmation message. In such case, the service may be transitorily in a state of no master replica only in a period of time during which the transfer confirmation message is sent and received, and such a period of time is usually at a microsecond level, which is quite short and therefore has little impact.

Based on the method shown in FIG. 1, this specification further provides some specific implementation solutions and extension solutions of the method, which are further described below.

Figure 2:
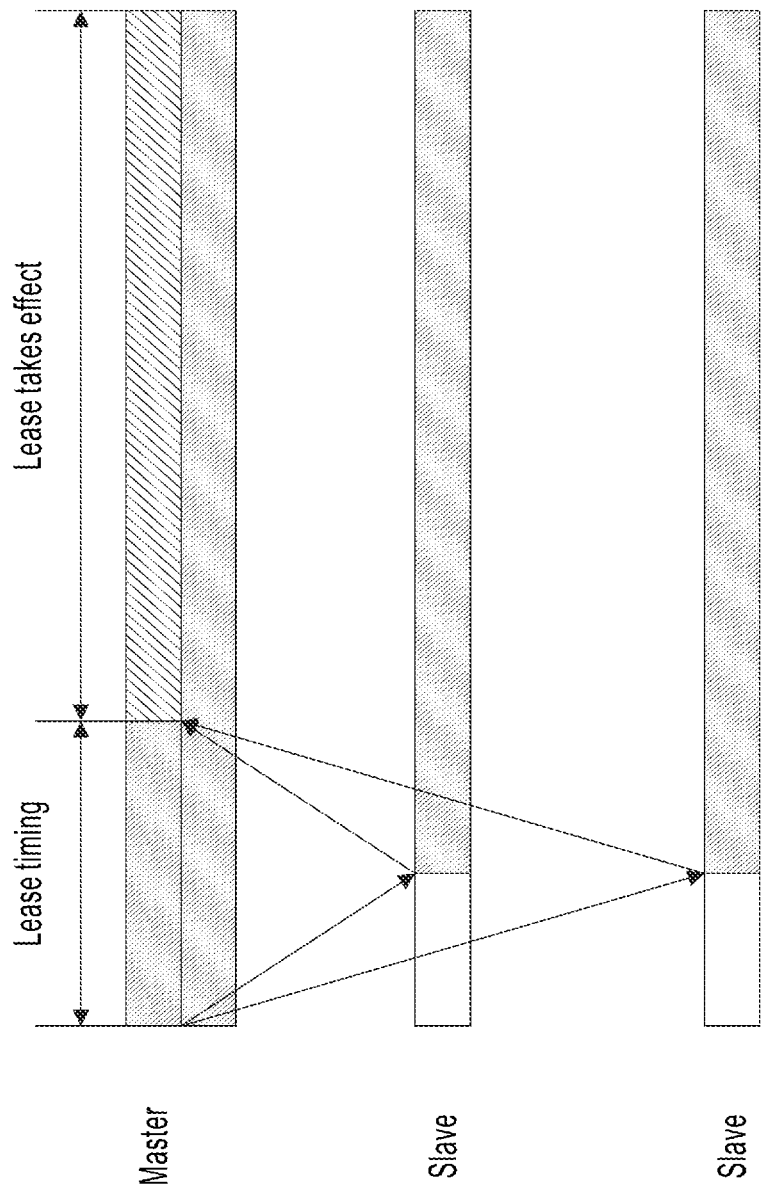
FIG. 2 is a schematic diagram illustrating a principle of a master/slave lease solution, according to one or more embodiments of this specification.

Based on the above-mentioned description, the master/slave leases are further described more visually with reference to the time axis. References are made to FIG. 2. FIG. 2 is a schematic diagram illustrating a principle of a master/slave lease solution, according to one or more embodiments of this specification. In the scenario of FIG. 2, it is assumed that the corresponding service initially does not have the master replica. In such case, a replicator is ready to become the master replicator, and the replicator is referred to as a candidate master replicator. The uppermost part of the figure represents a time axis (a time sequence is from left to right) of the candidate master replicator, and the two lower parts of the figure each represent a time axis of one slave replicator.

A lease workflow corresponding to FIG. 2 can include the following steps:

2.1. The candidate master replicator performs lease timing for a master replica lease locally, and enters a lease timing stage. In such case, the master replica lease has not yet taken effect.

2.2. The candidate master replicator sends a lease write message to another slave replicator (as shown by an arrow pointing from the candidate master replicator to the slave replicator; in such case, the candidate master replica also considers the candidate master replicator as a slave replicator). After receiving the lease write message, the another slave replicator locally starts a lease corresponding to the master replica lease, namely, the above-mentioned corresponding lease. The two leases have the same lease duration. During the lease start period, the another slave replicator does not have to respond to messages from other slave replicators, and then returns a response to the candidate master replicator (as shown by an arrow pointing from the slave replicator to the candidate master replicator).

2.3. After receiving the responses from the majority of the slave replicators, the candidate master replicator considers that the lease has been written successfully. In such case, the master replica lease starts to take effect, and the candidate master replicator enters a lease validation stage and officially becomes the master replicator.

Subsequently, the master replicator only needs to similarly perform the above-mentioned procedure before expiration of the lease to extend the master replica lease as required, until the master replicator does not need to maintain the master replica status, for example, the master replicator is shut down. The above-mentioned procedure ensures the uniqueness of the master replica, since the master replica lease certainly expires before the corresponding lease on the slave replicator. As such, before the corresponding lease expires, the slave replicator cannot respond to messages from other replicators, thereby ensuring that all master replicators of the same service are mutually exclusive.

Figure 3:
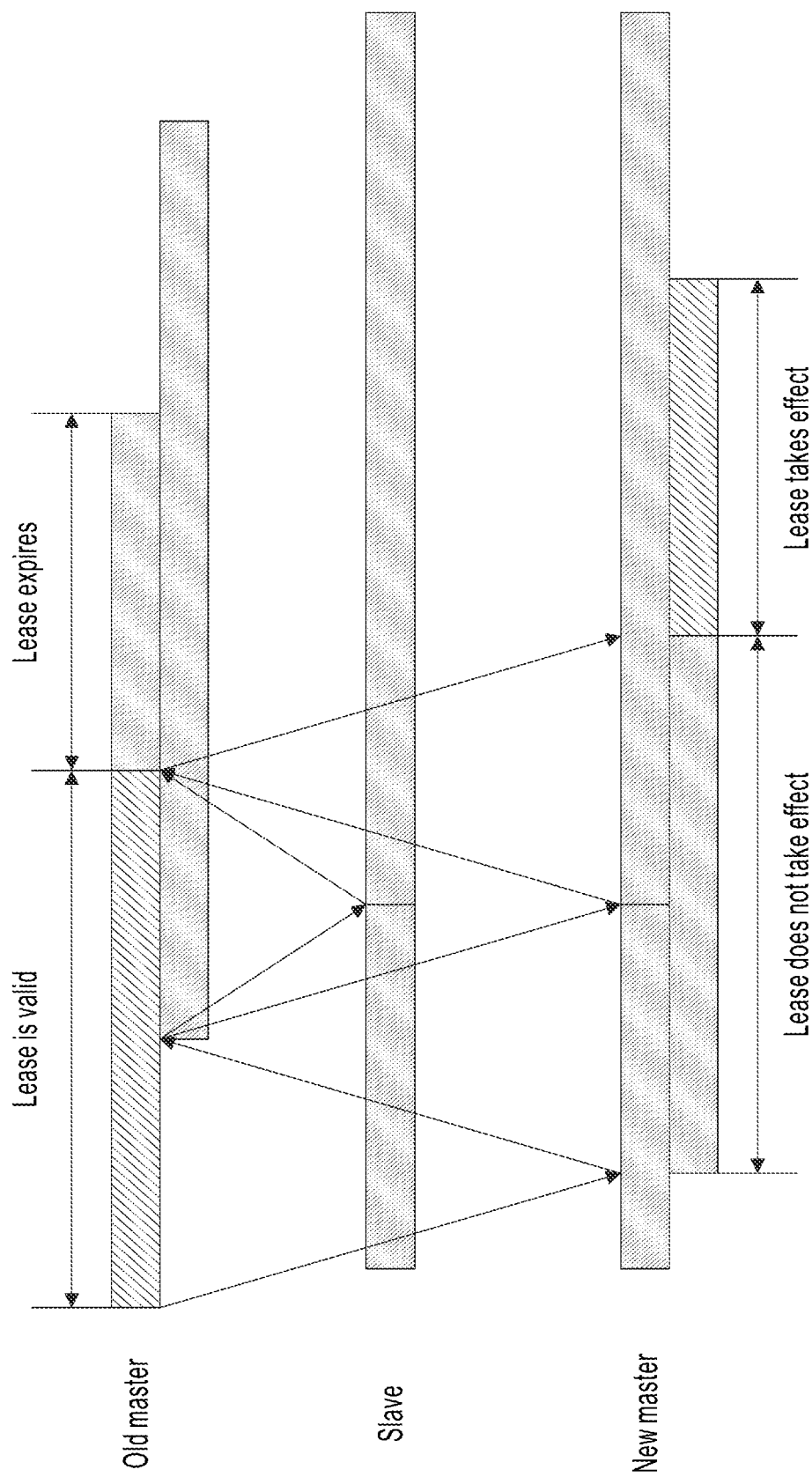
FIG. 3 is a schematic diagram illustrating a principle of the solution in FIG. 1, according to one or more embodiments of this specification.

Further, after the above-mentioned initial process ends, there may be a requirement for transferring the master replica. In such case, the procedure in FIG. 1 is correspondingly performed to implement transfer of the master replica lease. More visually, one or more embodiments of this specification further provide a schematic diagram illustrating a principle of the solution in FIG. 1. As shown in FIG. 3, the solution can be understood with reference to FIG. 2.

In FIG. 3, the uppermost part represents a current master replicator, that is, an old master replicator; the lowermost part represents a target replicator, that is, a new master replicator. The middle part represents another slave replicator. Only one slave replicator is shown, and there can be a plurality of slave replicators.

A lease transfer procedure corresponding to FIG. 3 can include the following steps:

3.1. The old master replicator sends a transfer preparation message to the new master replicator (as shown by the first arrow between the old master replicator and the new master replicator).

3.2. After receiving the transfer preparation message, the new master replicator locally starts to pre-calculate a new master replica lease (which has not yet taken effect in such case), and then returns a readiness response to the old master replicator (as shown by the second arrow between the old master replicator and the new master replicator).

3.3. After confirming that the new master replicator completes the pre-calculation, the old master replicator extends the lease once to another slave replicator to extend corresponding leases of a majority of slave replicas (as shown by two arrows between the old master replicator and the slave replicator). Certainly, the new master replicator can also be considered as a slave replicator temporarily, and the lease is also extended for the new master replicator (as shown by the third and fourth arrows between the old master replicator and the new master replicator).

3.4. After the lease extension succeeds, the old master replicator terminates in advance the local old master replica lease that is still currently valid, enters a lease expiration stage, and sends a transfer confirmation message to the new master replica (as shown by the fifth arrow between the old master replicator and the new master replicator).

3.5. After receiving the transfer confirmation message, the new master replicator validates the previously pre-calculated new master replica lease and officially becomes a new master replicator.

It is worthwhile to note that, how the slave replicator faces a subsequent lease extension message from the new master replicator is further considered.

In one or more embodiments of this specification, it can be ensured that the slave replicator unconditionally accepts the lease as long as there is the lease extension message, and the slave replicator does not need to care about the holder of the lease, which does not damage correctness of an election agreement between the slave replicators.

The reason is that the leases do not intersect, and the next master replicator certainly appears after expiration of the leases of the majority of slave replicators. If the above-mentioned new master replicator succeeds in taking the place but its master replica lease does not expire, and the leases of the majority of slave replicators expire at a later time rather than an earlier time, the master replicator can normally extend the lease.

If a previous message from the old master replicator arrives at the slave replicator (for example, a message sent at a previous moment arrives at the slave replicator after delay by an excessively long time), the slave replicator may extend its lease unexpectedly. However, when the slave replicator responds to the old master replicator, the old master replicator has no valid master replica lease since the old master replicator has currently lost the master replica status. Consequently, the old master replicator cannot normally receive or process a response message from the slave replicator, and the uniqueness of the master replica is not damaged. Based on such an idea, after the old master replicator terminates its local master replica lease in advance, if a remaining slave replicator delays in receiving a message that is sent by the old master replicator before the master replica lease is terminated, the remaining slave replicator returns a response to the old master replicator, but the old master replicator does not receive the response or does not reply to the response.

During specific implementation, more reliably, the lease holder and a term of each master replicator can be further recorded in the lease so as to avoid mutual interference between messages from the master replicators of different terms.

In the above-mentioned procedure, the master replica transfer can be completed through message exchange for five times (some milliseconds are expected to be consumed) without waiting for the expiration of the master replica lease of the old master replicator. In addition, during the transfer, the new master replica lease is forced to expire before the corresponding leases of the majority of slave replicators, thereby ensuring the uniqueness of the master replica.

According to the solution in this application, with reference to a lease mechanism and improvement, on the basis of ensuring the uniqueness of the master replica, the action of transferring the master replica can be controlled to be completed within some milliseconds, which is of great significance in actual production. An advantage is that load balancing can be supported more quickly, helping improve working efficiency of the entire distributed system.

In one or more embodiments of this specification, it is assumed that a machine in the distributed system includes a plurality of different master replicators corresponding to different services, respectively. During selection of a target replicator, some of the plurality of different master replicators determine, from a plurality of slave replicators that correspond to the same services as some master replicators, one slave replicator on another machine in the distributed system as the target replicator. The another machine satisfies a specified condition that a workload is sufficiently slight, or a specified condition that a quantity of local master replicators (master replicas of different services) is sufficiently small (for example, there is currently no master replicator in the local machine, it can be expected that even after the master replica transfer, the quantity of local master replicators in the another machine still does not exceed the quantity of master replicators in the previous machine, and so on), and sends a transfer preparation message to the target replicator such that different master replicators are more evenly distributed to different machines or nodes through master replica transfer.

Figure 4A:
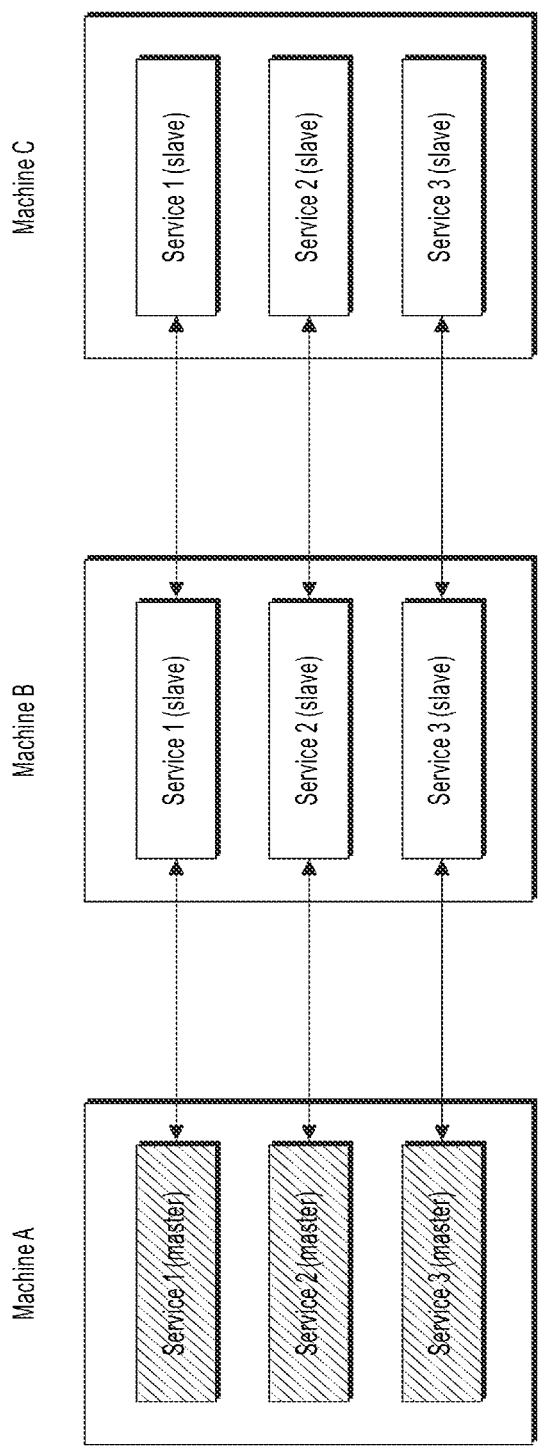
FIG. 4(a) and FIG. 4(b) are schematic diagrams illustrating comparison before and after master replica transfer, according to one or more embodiments of this specification.
Figure 4B:
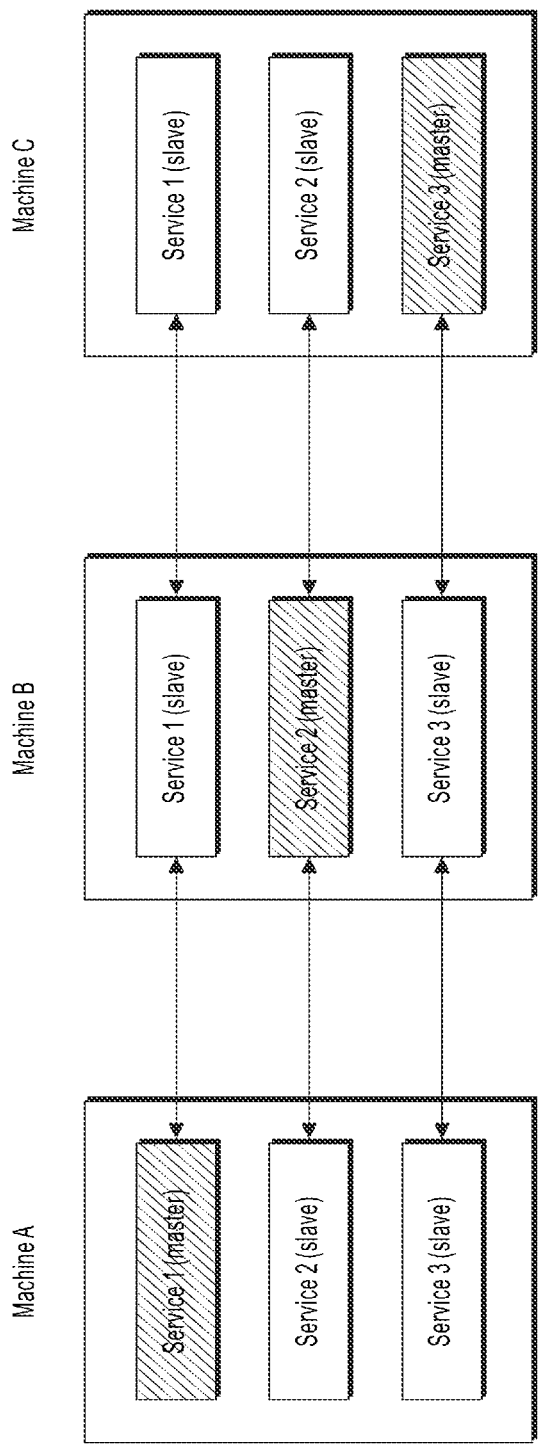

More visually, one or more embodiments of this specification further provide schematic diagrams illustrating comparison before and after master replica transfer, as shown in FIG. 4(a) and FIG. 4(b), respectively.

FIG. 4(a) shows a case before the master replica transfer, in which three machines, namely, a machine A, a machine B, and a machine C, and three services, namely, a service 1, a service 2, and a service 3, are provided as examples. Each service has one master replicator and two slave replicators. The service 1 is used as an example. The master replicator of the service 1 is represented as "service 1 (master)" in the figure, and the slave replicator of the service 1 is represented as "service 1 (slave)" in the figure.

Currently, the master replicators of the three services are all on the machine A, one slave replicator of each of the three services is on the machine B, and the other slave replicator of each of the three services is on the machine C.

For the service 2, "service 2 (slave)" on the machine B is selected as a target replicator, and "service 2 (master)" is transferred from the machine A to the machine B. Similarly, for the service 3, "service 3 (slave)" on the machine C is selected as a target replicator, and "service 3 (master)" is transferred from the machine A to the machine C.

FIG. 4(*b*) shows a case after the master replica transfer. It can be seen that, after the transfer, there is only one master replicator on each of the machine A, the machine B, and the machine C such that the load is more balanced. Based on the solution in this application, while ensuring the uniqueness of the master replica, a load balancing policy can be quickly responded to, and the location of the master replicator can be quickly redeployed within a time at the millisecond level, thereby implementing efficiently dynamic load balancing.

Figure 5:
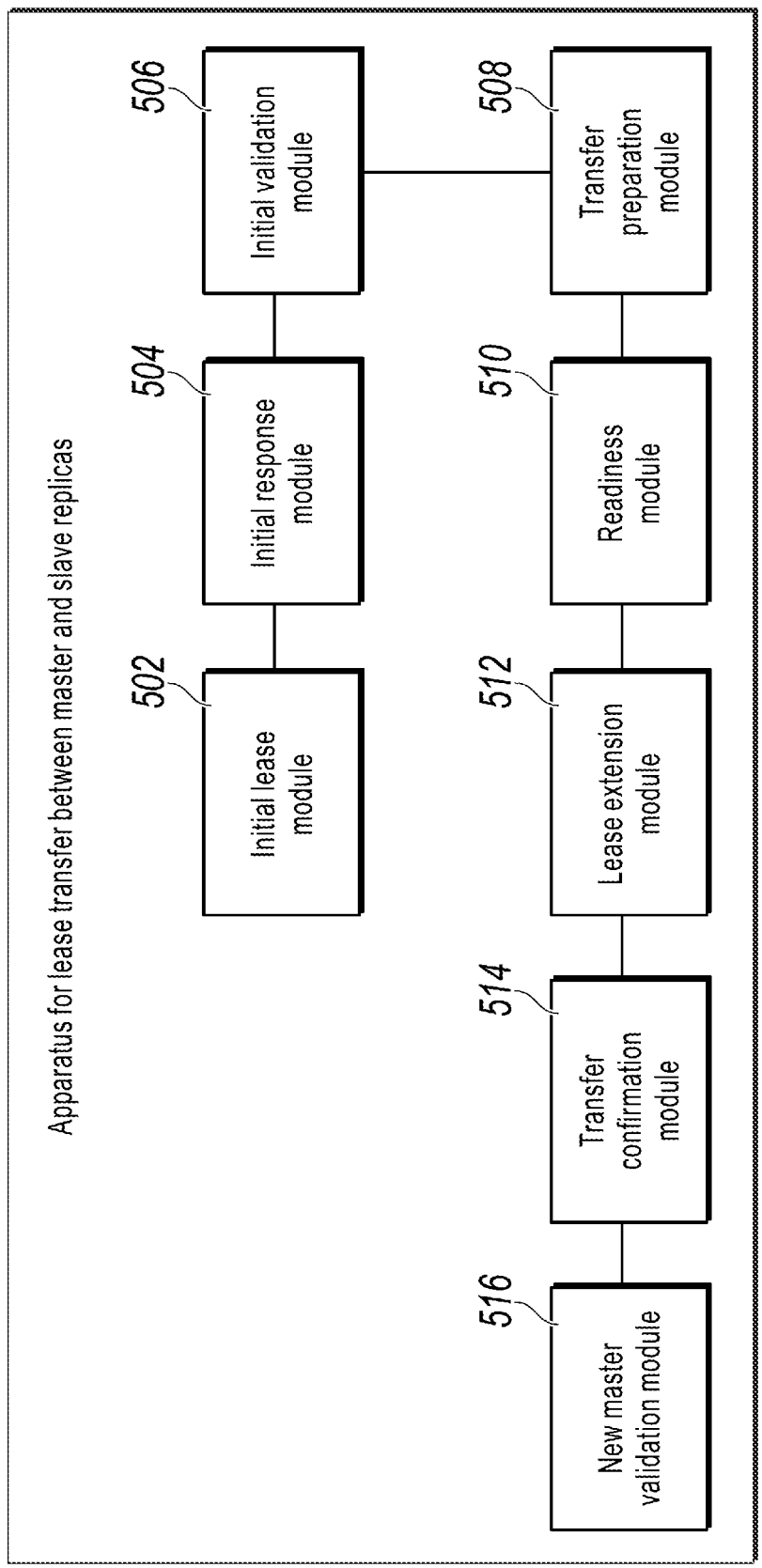
FIG. 5 is a schematic structural diagram illustrating an apparatus for lease transfer between master and slave replicas, according to one or more embodiments of this specification.
Figure 6:
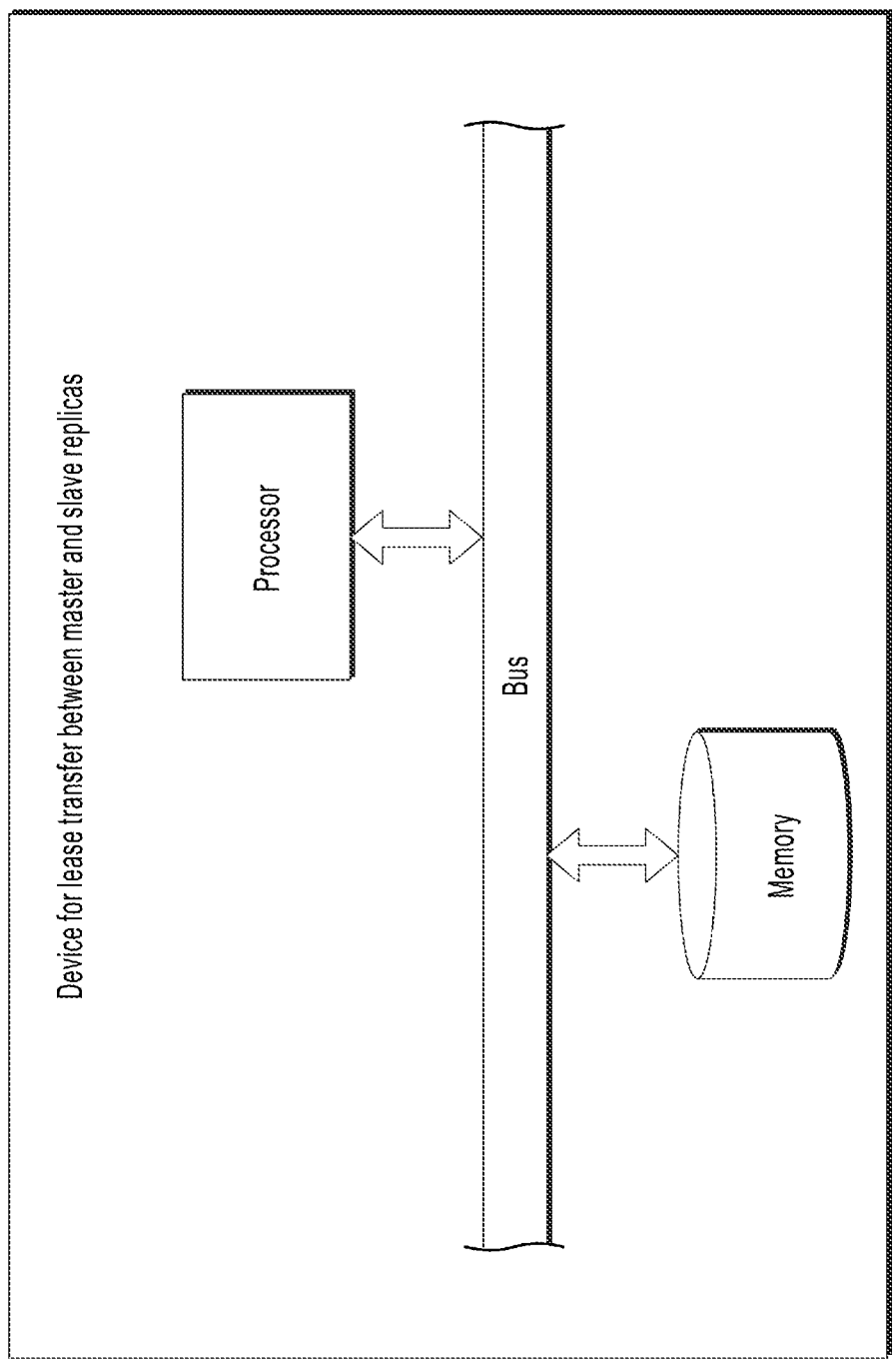
FIG. 6 is a schematic structural diagram illustrating a device for lease transfer between master and slave replicas, according to one or more embodiments of this specification.

Based on the same idea, one or more embodiments of this specification further provide apparatuses and devices corresponding to the above-mentioned methods, as shown in FIG. 5 and FIG. 6.

FIG. 5 is a schematic structural diagram illustrating an apparatus for lease transfer between master and slave replicas, according to one or more embodiments of this specification. The apparatus includes: an initial lease module 502 belonging to the master replicator, configured to locally start to calculate an initial master replica lease, and send a lease establishment message to a plurality of slave replicators; an initial response module 504 belonging to the slave replicators, configured to locally start to calculate corresponding leases at the slave replicators after receiving the lease establishment message, and send lease establishment success responses to the master replicator; an initial validation module 506 belonging to the master replicator, configured to determine that the local master replica lease of the master replicator takes effect in response to receiving the lease establishment success responses from a majority of the slave replicators; a transfer preparation module 508 belonging to the master replicator, configured to send a transfer preparation message to a target replicator in the plurality of slave replicators before the local current master replica lease of the master replicator expires in response to determining that master replica transfer needs to be performed; a readiness module 510 belonging to the target replicator, configured to locally start and calculate a new master replica lease at the target replicator after receiving the transfer preparation message, and return a readiness response to the master replicator; a lease extension module 512 belonging to the master replicator, configured to send a lease extension message to remaining slave replicators after receiving the readiness response, to extend local corresponding leases of the remaining slave replicators; a transfer confirmation module 514 belonging to the master replicator, configured to terminate the local master replica lease of the master replicator in advance after receiving lease extension success responses returned by a majority of the slave replicators, and send a transfer confirmation message to the target replicator; and a new master validation module 516 belonging to the target replicator, configured to validate the new master replica lease after receiving the transfer confirmation message, to make the target replicator a new master replicator.

Optionally, a lease termination time of the local corresponding leases of the remaining slave replicators after the extension is later than a lease termination time of the new master replica lease.

Optionally, the readiness module 510 is configured to forwardly calculate specified lease duration by using a local current time as a start point to obtain the lease termination time of the new master replica lease, and keep the new master replica lease in an ineffective state, and start timing for the new master replica lease from the current time; and the apparatus further includes: an extension response module belonging to the slave replicas in the majority of the slave replicas, configured to forwardly calculate, before receiving the lease extension success responses returned by the majority of the slave replicators and after receiving the lease extension message, the specified lease duration by using the local current time as the start point to obtain a lease termination time of local corresponding leases of the slave replicators after the extension.

Optionally, a master replica management module belonging to a distributed system is configured to: before the sending a transfer preparation message to a target replicator in the plurality of slave replicators, determine that a plurality of different master replicators respectively corresponding to different services appear on the same machine in the distributed system; and the transfer preparation module 602 of some of the plurality of different master replicators is configured to determine, as the target replicator, a slave replicator on another machine in the distributed system from a plurality of slave replicators that correspond to the same services as some master replicators, where the another machine meets a specified condition that there are sufficiently few local master replicators on the another machine; and send the transfer preparation message to the target replicator.

Optionally, the lease extension module 512 is configured to notify the remaining slave replicators that the target replicator is to take the place of the master replicator and become a new master replicator.

Optionally, the apparatus further includes: a response module belonging to the remaining slave replicators, configured to: after the terminating the local master replica lease of the master replicator in advance, return responses to the master replicator in response to delaying in receiving a message that is sent by the master replicator before the master replica lease is terminated; and a rejection module belonging to the master replicator, configured to skip receiving or replying to the response.

FIG. 6 is a schematic structural diagram illustrating a device for lease transfer between master and slave replicas, according to one or more embodiments of this specification. The device includes: at least one processor; and a memory communicatively connected to the at least one processor, where the memory stores an instruction that can be executed by the at least one processor, and the instruction is executed by the at least one processor to enable the at least one processor to perform the following operations: locally starting to calculate, by a master replicator, an initial master replica lease, and sending a lease establishment message to a plurality of slave replicators; locally starting to calculate, by the slave replicators after receiving the lease establishment message, corresponding leases at the slave replicators, and sending lease establishment success responses to the master replicator; determining, by the master replicator, that the local master replica lease of the master replicator takes effect in response to receiving the lease establishment success responses from a majority of the slave replicators; sending, by the master replicator, a transfer preparation message to a target replicator in the plurality of slave replicators before the local current master replica lease of the master replicator expires in response to determining that master replica transfer needs to be performed; locally starting and calculating, by the target replicator after receiving the transfer preparation message, a new master replica lease at the target replicator, and returning a readiness response to the master replicator; sending, by the master replicator after receiving the readiness response, a lease extension message to remaining slave replicators to extend local corresponding leases of the remaining slave replicators; terminating, by the master replicator after receiving lease extension success responses returned by a majority of the slave replicators, the local master replica lease of the master replicator in advance, and sending a transfer confirmation message to the target replicator; and validating, by the target replicator after receiving the transfer confirmation message, the new master replica lease to make the target replicator a new master replicator.

Based on the same idea, one or more embodiments of this specification further provide a non-volatile computer storage medium corresponding to the method in FIG. 1, where the non-volatile computer storage medium stores a computer-executable instruction, and the computer-executable instruction is set to perform the following operations: locally starting to calculate, by a master replicator, an initial master replica lease, and sending a lease establishment message to a plurality of slave replicators; locally starting to calculate, by the slave replicators after receiving the lease establishment message, corresponding leases at the slave replicators, and sending lease establishment success responses to the master replicator; determining, by the master replicator, that the local master replica lease of the master replicator takes effect in response to receiving the lease establishment success responses from a majority of the slave replicators; sending, by the master replicator, a transfer preparation message to a target replicator in the plurality of slave replicators before the local current master replica lease of the master replicator expires in response to determining that master replica transfer needs to be performed; locally starting and calculating, by the target replicator after receiving the transfer preparation message, a new master replica lease at the target replicator, and returning a readiness response to the master replicator; sending, by the master replicator after receiving the readiness response, a lease extension message to remaining slave replicators to extend local corresponding leases of the remaining slave replicators; terminating, by the master replicator after receiving lease extension success responses returned by a majority of the slave replicators, the local master replica lease of the master replicator in advance, and sending a transfer confirmation message to the target replicator; and validating, by the target replicator after receiving the transfer confirmation message, the new master replica lease to make the target replicator a new master replicator.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer-readable program code, logic programming can be performed on method steps to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively, the apparatus configured to implement various functions can even be considered as both a software module implementing the method and a structure in the hardware component.

The system, apparatus, module, or unit illustrated in the above-mentioned embodiments can be specifically implemented by using a computer chip or an entity, or can be implemented by using a product having a specific function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, when this specification is implemented, a function of each unit can be implemented in one or more pieces of software and/or hardware.

A person skilled in the art should understand that the embodiments of this specification can be provided as methods, systems, or computer program products. Therefore, the embodiments of this specification can use a form of hardware only embodiments, software only embodiments, or embodiments with a combination of software and hardware. Moreover, some embodiments of this specification can use a form of a computer program product that is implemented on one or more computer-usable storage media (including but not limited to a disk memory, a CD-ROM, an optical memory, etc.) that include computer-usable program code.

This specification is described with reference to the flowcharts and/or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which can implement information storage by using any method or technology. Information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette tape, a cassette magnetic disk storage, or another magnetic storage device, or any other non-transmission media, which can be configured to store information that can be accessed by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion such that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

This specification can be described in the general context of computer-executable instructions to be executed by a computer, for example, a program module. Generally, the program module includes a routine, a program, an object, a component, a data structure, etc. executing a specific task or implementing a specific abstract data type. This specification can alternatively be practiced in distributed computing environments. In the distributed computing environments, tasks are performed by remote processing devices connected through a communication network. In the distributed computing environments, the program module can be located in a local and remote computer storage medium including a storage device.

Some embodiments of this specification are described in a progressive way. For same or similar parts of some embodiments, mutual references can be made to the embodiments. Each embodiment focuses on a difference from other embodiments. Particularly, some apparatus embodiments, some device embodiments, and some non-volatile computer storage medium embodiments are briefly described since they are basically similar to some method embodiments. For related parts, references can be made to related descriptions in the method embodiments.

Some specific embodiments of this specification are described above. Other embodiments fall within the scope of the appended claims. In some cases, actions or steps described in the claims can be performed in a sequence different from that in some embodiments and desired results can still be achieved. In addition, processes described in the accompanying drawings do not necessarily need a specific order or a sequential order shown to achieve the desired results. In some implementations, multi-tasking and parallel processing are also possible or may be advantageous.

The above-mentioned descriptions are merely one or more embodiments of this specification and are not intended to limit this specification. A person skilled in the art can make various changes and variations to one or more embodiments of this specification. Any modification, equivalent replacement, or improvement made without departing from the spirit and principle of one or more embodiments of this specification shall fall within the scope of the claims in this specification.

What is claimed is:

1. A computer-implemented method for replica lease transfer, comprising:
    locally starting to calculate, by a master replicator, an initial master replica lease;

sending a lease establishment message to a plurality of slave replicators;
locally starting to calculate, by the slave replicators after receiving the lease establishment message, corresponding leases at the slave replicators;
sending lease establishment success responses to the master replicator;
determining, by the master replicator in response to receiving the lease establishment success responses from a majority of the slave replicators, that a local master replica lease of the master replicator takes effect;
sending, by the master replicator before a local current master replica lease of the master replicator expires in response to a determination that that a master replica transfer needs to be performed, a transfer preparation message to a target replicator in the plurality of slave replicators;
locally starting and calculating, by the target replicator after receiving the transfer preparation message, a new master replica lease at the target replicator;
returning a readiness response to the master replicator;
sending, by the master replicator after receiving the readiness response, a lease extension message to remaining slave replicators to extend local corresponding leases of the remaining slave replicators;
terminating, by the master replicator after receiving lease extension success responses returned by a majority of the slave replicators, the local master replica lease of the master replicator in advance, and sending a transfer confirmation message to the target replicator; and
validating, by the target replicator after receiving the transfer confirmation message, the new master replica lease to make the target replicator a new master replicator.

2. The computer-implemented method of claim 1, wherein a lease termination time of the local corresponding leases of the remaining slave replicators after a lease extension is later than a lease termination time of the new master replica lease.

3. The computer-implemented method of claim 2, wherein locally starting and calculating a new master replica lease at the target replicator, comprises:
forwardly calculating, by the target replicator, specified lease duration by using a local current time as a start point to obtain the lease termination time of the new master replica lease, and keeping the new master replica lease in an ineffective state;
starting timing for the new master replica lease from the local current time; and
before receiving lease extension success responses returned by a majority of the slave replicators:
forwardly calculating, by the majority of the slave replicators after receiving the lease extension message, the specified lease duration by using the local current time as the start point to obtain a lease termination time of local corresponding leases of the slave replicators after the lease extension.

4. The computer-implemented method of claim 1, wherein, before sending a transfer preparation message to a target replicator in the plurality of slave replicators, comprises:
determining that a plurality of different master replicators respectively corresponding to different services appear on a same machine in a distributed system; and
sending a transfer preparation message to a target replicator in the plurality of slave replicators, comprises:
determining, as the target replicator by some of the plurality of different master replicators, a slave replicator on another machine in the distributed system from a plurality of slave replicators that correspond to same services as some master replicators, wherein the another machine meets a specified condition that there are sufficiently few local master replicators on the another machine; and
sending the transfer preparation message to the target replicator.

5. The computer-implemented method of claim 1, wherein sending a lease extension message to remaining slave replicators, comprises:
notifying, by the master replicator, the remaining slave replicators that the target replicator is to replace of the master replicator and to become a new master replicator.

6. The computer-implemented method of claim 1, wherein, after terminating the local master replica lease of the master replicator in advance:
returning, by the remaining slave replicators, responses to the master replicator in response to delaying in receiving a message that is sent by the master replicator before the local master replica lease is terminated.

7. The computer-implemented method of claim 6, comprising:
skipping, by the master replicator, receiving or replying to a response.

8. A non-transitory, computer-readable medium storing one or more instructions executable by a computer system to perform one or more operations for replica lease transfer, comprising:
locally starting to calculate, by a master replicator, an initial master replica lease;
sending a lease establishment message to a plurality of slave replicators;
locally starting to calculate, by the slave replicators after receiving the lease establishment message, corresponding leases at the slave replicators;
sending lease establishment success responses to the master replicator;
determining, by the master replicator in response to receiving the lease establishment success responses from a majority of the slave replicators, that a local master replica lease of the master replicator takes effect;
sending, by the master replicator before a local current master replica lease of the master replicator expires in response to a determination that that a master replica transfer needs to be performed, a transfer preparation message to a target replicator in the plurality of slave replicators;
locally starting and calculating, by the target replicator after receiving the transfer preparation message, a new master replica lease at the target replicator;
returning a readiness response to the master replicator;
sending, by the master replicator after receiving the readiness response, a lease extension message to remaining slave replicators to extend local corresponding leases of the remaining slave replicators;
terminating, by the master replicator after receiving lease extension success responses returned by a majority of the slave replicators, the local master replica lease of the master replicator in advance, and sending a transfer confirmation message to the target replicator; and validating, by the target replicator after receiving the transfer confirmation message, the new master replica lease to make the target replicator a new master replicator.

9. The non-transitory, computer-readable medium of claim 8, wherein a lease termination time of the local corresponding leases of the remaining slave replicators after a lease extension is later than a lease termination time of the new master replica lease.

10. The non-transitory, computer-readable medium of claim 9, wherein locally starting and calculating a new master replica lease at the target replicator, comprises:
   forwardly calculating, by the target replicator, specified lease duration by using a local current time as a start point to obtain the lease termination time of the new master replica lease, and keeping the new master replica lease in an ineffective state;
   starting timing for the new master replica lease from the local current time; and
   before receiving lease extension success responses returned by a majority of the slave replicators:
      forwardly calculating, by the majority of the slave replicators after receiving the lease extension message, the specified lease duration by using the local current time as the start point to obtain a lease termination time of local corresponding leases of the slave replicators after the lease extension.

11. The non-transitory, computer-readable medium of claim 8, wherein, before sending a transfer preparation message to a target replicator in the plurality of slave replicators, comprises:
   determining that a plurality of different master replicators respectively corresponding to different services appear on a same machine in a distributed system; and
   sending a transfer preparation message to a target replicator in the plurality of slave replicators, comprises:
      determining, as the target replicator by some of the plurality of different master replicators, a slave replicator on another machine in the distributed system from a plurality of slave replicators that correspond to same services as some master replicators, wherein the another machine meets a specified condition that there are sufficiently few local master replicators on the another machine; and
      sending the transfer preparation message to the target replicator.

12. The non-transitory, computer-readable medium of claim 8, wherein sending a lease extension message to remaining slave replicators, comprises:
   notifying, by the master replicator, the remaining slave replicators that the target replicator is to replace of the master replicator and to become a new master replicator.

13. The non-transitory, computer-readable medium of claim 8, wherein, after terminating the local master replica lease of the master replicator in advance:
   returning, by the remaining slave replicators, responses to the master replicator in response to delaying in receiving a message that is sent by the master replicator before the local master replica lease is terminated.

14. The non-transitory, computer-readable medium of claim 13, comprising:
   skipping, by the master replicator, receiving or replying to a response.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations for replica lease transfer, comprising:
      locally starting to calculate, by a master replicator, an initial master replica lease;
      sending a lease establishment message to a plurality of slave replicators;
      locally starting to calculate, by the slave replicators after receiving the lease establishment message, corresponding leases at the slave replicators;
      sending lease establishment success responses to the master replicator;
      determining, by the master replicator in response to receiving the lease establishment success responses from a majority of the slave replicators, that a local master replica lease of the master replicator takes effect;
      sending, by the master replicator before a local current master replica lease of the master replicator expires in response to a determination that that a master replica transfer needs to be performed, a transfer preparation message to a target replicator in the plurality of slave replicators;
      locally starting and calculating, by the target replicator after receiving the transfer preparation message, a new master replica lease at the target replicator;
      returning a readiness response to the master replicator;
      sending, by the master replicator after receiving the readiness response, a lease extension message to remaining slave replicators to extend local corresponding leases of the remaining slave replicators;
      terminating, by the master replicator after receiving lease extension success responses returned by a majority of the slave replicators, the local master replica lease of the master replicator in advance, and sending a transfer confirmation message to the target replicator; and
      validating, by the target replicator after receiving the transfer confirmation message, the new master replica lease to make the target replicator a new master replicator.

16. The computer-implemented system of claim 15, wherein a lease termination time of the local corresponding leases of the remaining slave replicators after a lease extension is later than a lease termination time of the new master replica lease.

17. The computer-implemented system of claim 16, wherein locally starting and calculating a new master replica lease at the target replicator, comprises:
   forwardly calculating, by the target replicator, specified lease duration by using a local current time as a start point to obtain the lease termination time of the new master replica lease, and keeping the new master replica lease in an ineffective state;
   starting timing for the new master replica lease from the local current time; and
   before receiving lease extension success responses returned by a majority of the slave replicators:
      forwardly calculating, by the majority of the slave replicators after receiving the lease extension message, the specified lease duration by using the local current time as the start point to obtain a lease termination time of local corresponding leases of the slave replicators after the lease extension.

18. The computer-implemented system of claim 15, wherein, before sending a transfer preparation message to a target replicator in the plurality of slave replicators, comprises:

determining that a plurality of different master replicators respectively corresponding to different services appear on a same machine in a distributed system; and sending a transfer preparation message to a target replicator in the plurality of slave replicators, comprises:

determining, as the target replicator by some of the plurality of different master replicators, a slave replicator on another machine in the distributed system from a plurality of slave replicators that correspond to same services as some master replicators, wherein the another machine meets a specified condition that there are sufficiently few local master replicators on the another machine; and sending the transfer preparation message to the target replicator.

19. The computer-implemented system of claim 15, wherein sending a lease extension message to remaining slave replicators, comprises:

notifying, by the master replicator, the remaining slave replicators that the target replicator is to replace of the master replicator and to become a new master replicator.

20. The computer-implemented system of claim 15, wherein, after terminating the local master replica lease of the master replicator in advance:

returning, by the remaining slave replicators, responses to the master replicator in response to delaying in receiving a message that is sent by the master replicator before the local master replica lease is terminated.

\* \* \* \* \*

UNITED STATES PATENT AND TRADEMARK OFFICE
CERTIFICATE OF CORRECTION

PATENT NO. : 12,225,075 B2
APPLICATION NO. : 18/490487
DATED : February 11, 2025
INVENTOR(S) : Xuwang Teng et al.

Page 1 of 1

It is certified that error appears in the above-identified patent and that said Letters Patent is hereby corrected as shown below:

In the Claims

Column 19, Line 15, Claim 1, please replace "that that" with -- that --.

Column 20, Line 51, Claim 8, please replace "that that" with -- that --.

Column 22, Line 23, Claim 15, please replace "that that" with -- that --.

Signed and Sealed this
Eighth Day of April, 2025

Coke Morgan Stewart
*Acting Director of the United States Patent and Trademark Office*